United States Patent [19]
Dattilo

[11] 3,962,993
[45] June 15, 1976

[54] TEMPERATURE CONTROLLED ANIMAL HOUSE

[76] Inventor: Donald P. Dattilo, 9405 Doral Court, Louisville, Ky. 40220

[22] Filed: Feb. 21, 1975

[21] Appl. No.: 551,593

[52] U.S. Cl. .................................................. 119/19
[51] Int. Cl.² .......................................... A01K 1/00
[58] Field of Search ................... 119/19, 1, 33, 16

[56] References Cited
UNITED STATES PATENTS

| | | | |
|---|---|---|---|
| 1,715,175 | 5/1929 | Stark et al. ............................ | 119/19 |
| 2,280,779 | 4/1942 | Baragy ................................... | 119/33 |
| 2,445,055 | 7/1948 | Capaul ................................... | 119/19 X |
| 3,048,147 | 8/1962 | McKean.................................. | 119/19 |
| 3,175,534 | 3/1965 | Pollard.................................... | 119/1 |
| 3,557,756 | 1/1971 | Ramsey.................................. | 119/19 |

*Primary Examiner*—Hugh R. Chamblee
*Attorney, Agent, or Firm*—Diller, Brown, Ramik & Wight

[57] ABSTRACT

This disclosure relates to a temperature controlled animal house, particularly a dog house, which includes first and second chambers, the first of which houses an animal and the second of which includes means for generating heat which is blown into the first chamber, the heat generating means including a socket to receive a conventional light bulb with the heat therefrom being blown by a fan into the first chamber. A thermostat in the first chamber regulates the temperature thereof and a second thermostat in the second chamber prevents overheating in the second chamber.

16 Claims, 5 Drawing Figures

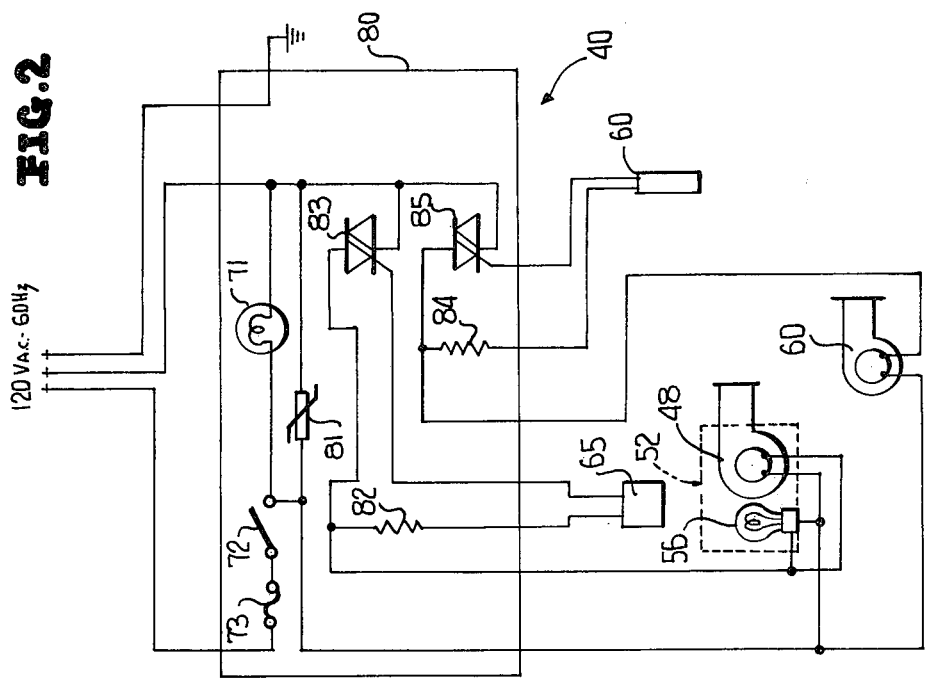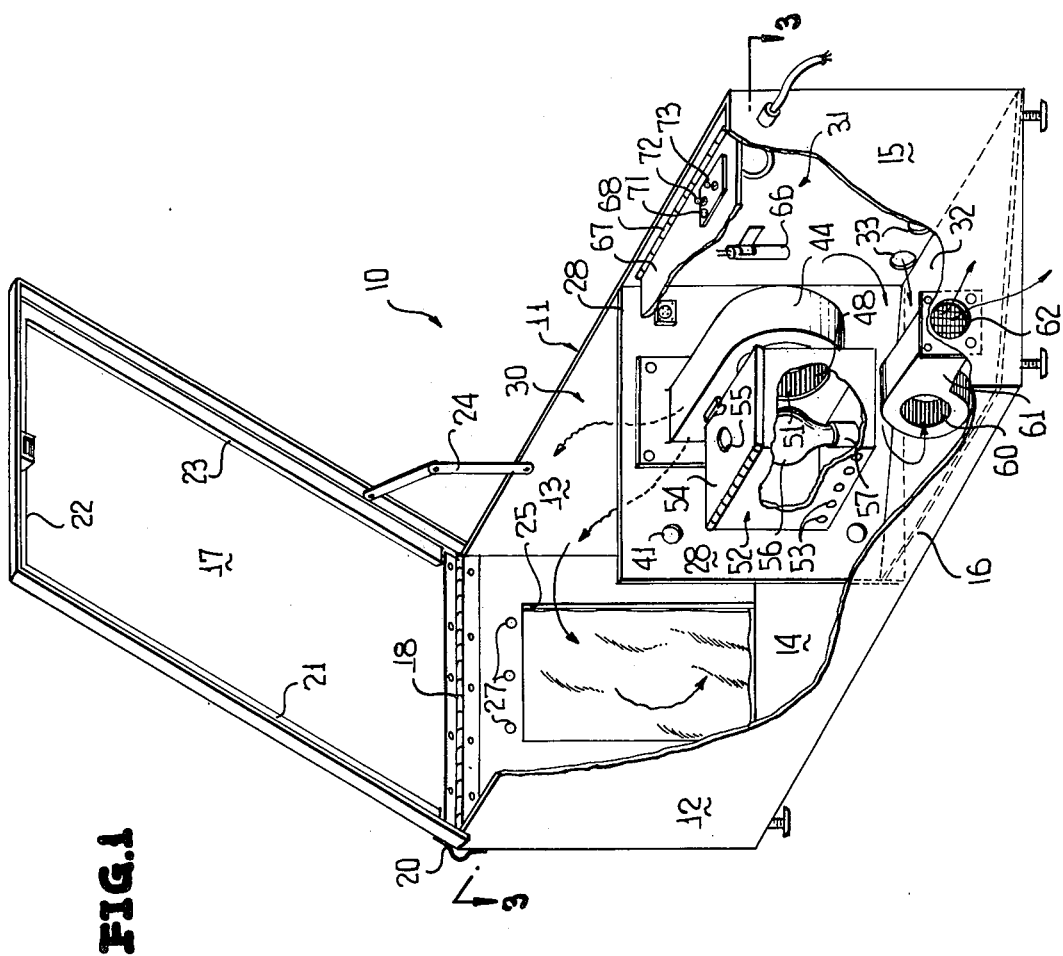

TEMPERATURE CONTROLLED ANIMAL HOUSE

Conventional houses for dogs, cats, or similar animals have been constructed in a multiplicity of different ways, generally to satisfy the particular desires of the owner of the occupant-animal. Little overall sophistication has been employed because for the most part domestic animals were kept generally indoors during inclement or cold weather, and out of doors otherwise. When pet owners left their homes for an appreciable length of time neighbors were generally entrusted with the care of their pets, or the pets were simply boarded with professional "pounds". However, absent the latter two possibilities pets were simply permitted to fend for themselves out of doors, in basements or the like and found themselves more than uncomfortable, particularly during cold weather if out of doors or if indoors the house thermostat was lowered appreciably, as is the usual practice of persons who leave their dwellings for extended periods of time.

The problems noted heretofore are compounded if the pet owners live in apartments, townhouses, condominiums or the like which have no basements or common areas, other than a porch or patio, for the tethering, keeping, etc. of unattended pets.

In keeping with the foregoing, it is a primary object of this invention to provide a novel house for animal pets, such as dogs, cats or the like which is divided into a first chamber for the animal and a second chamber housing heat generating means and means for conducting the heat from the second chamber to the first chamber with both chambers being thermostatically controlled and with the heat being generated by a conventional or standard light bulb which maintains heating costs at a minimum yet provides excellent ambient internal temperature in the chamber occupied by the animal.

In keeping with the present invention two different thermostats are provided, one in the first or animal occupied chamber to maintain its temperature at approximately 70°F., and the other thermostat being located in the second chamber to assure that it is maintained at a safe internal temperature. For example, a temperature of about 150°F. would cause energization of an exhaust fan and thus evacuate any excess heat from the second non-occupied chamber.

It is a further object of this invention to construct a novel animal house of the type described heretofore wherein a bottom wall of the second chamber is inclined toward apertures so that any condensation which might accumulate therein, although this possibility is remote, would be removed by gravity with the apertures further serving the purpose as air inlets to assure a constant circulation of fresh air inlets to assure a constant circulation of fresh air between the first and second chambers.

In addition, in keeping with this invention, the standard light bulb is housed within a third chamber located in the second chamber and being coupled to the fan for conducting the heat generated by the energized light bulb to be transmitted into the first or animal occupied chamber.

Still another object of this invention is to provide the third chamber with vent openings and a removable closure along with a sight opening, preferably though not necessarily in the latter, for viewing the lit or unlit condition of the bulb without removing the closure or otherwise gaining access into the interior of the third chamber.

A final object of this invention is to provide an exhaust fan in the second chamber to evacuate any excess heat produced by the light bulb in the third chamber.

With the above and other objects in view that will hereinafter appear, the nature of the invention will be more clearly understood by reference to the following detailed description, the appended claimed subject matter, and the several views illustrated in the accompanying drawings.

IN THE DRAWINGS

FIG. 1 is a perspective view with parts broken away for clarity of the animal house of this invention, and illustrates a pair of chambers, a pivoted cover, two separate thermostats, a light bulb in a third chamber, and two fans, one used to force heated air into the area occupied by the animal, the other used to evacuate excess internal heat created in the second chamber.

FIG. 2 illustrates circuitry for controlling the electrical components of the animal or dog house.

Figure 3:
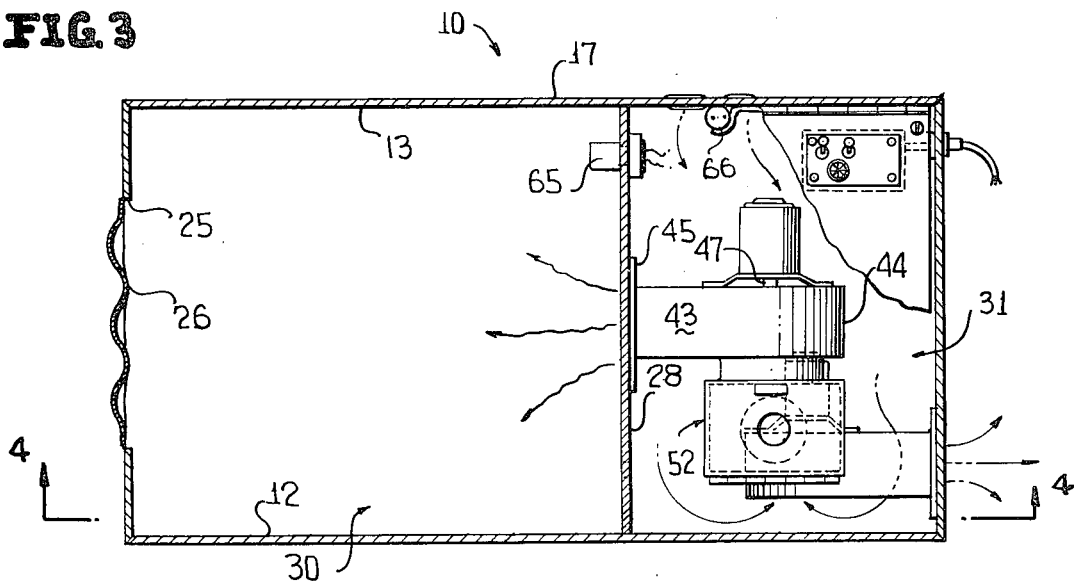
FIG. 3 is a sectional view taken generally along line 3—3 of FIG. 1, with the cover in the open position, and illustrates more clearly various components of the second chamber, as well as an additional cover thereof which includes an on-off switch, circuit breaker, etc.

A novel animal house for dogs, cats or similar pets is fully illustrated in FIGS. 1, 3, 4 and 5 of the drawings, and is generally designated by the reference numeral 10. The animal house 10 includes a housing 11 defined by side walls 12, 13, end walls 14, 15, a bottom wall and a top wall or cover 17 which is joined by a conventional piano hinge 18 or the equivalent to an upper portion (unnumbered) of the end wall 14. A strip 20 (FIGS. 1 and 4) of weathering material, such as rubber, is secured to adjacent edges (unnumbered) of the cover 17 and the end wall 14 to prevent moisture from entering into the housing 11. The cover 17 additionally includes along three of its edges (unnumbered) strips 21, 22 and 23 of insulating material which in the closed position (FIGS. 4 and 5) of the cover 17 rest upon the respective upper edges (unnumbered) of the walls 12, 15 and 13, respectively. A conventional hinge 24 has opposite ends of two arms pivotally connected to the cover 17 and the side wall 13 such that in the conventional manner the hinge 24 in the position shown in FIG. 1 is self locking and supports the cover 17 in its open position.

The end wall 14 has an opening 25 which, though shown to be rectangular, may be of any desired configuration and the exterior thereof is closed by a flap 26 of relatively flexible though weather-resistant material, such as rubber, canvas, or plastic, which is secured by rivets, screws or the like 27 to an upper edge portion (unnumbered) of the end wall 14.

Means in the form of a wall 28 serves to partition the housing 11 into a chamber 30 and a second chamber 31.

The first chamber 30 is the chamber occupied by the animal and is defined by portions of the walls 12, 13, the wall 14, and the partition 28.

Figure 4:
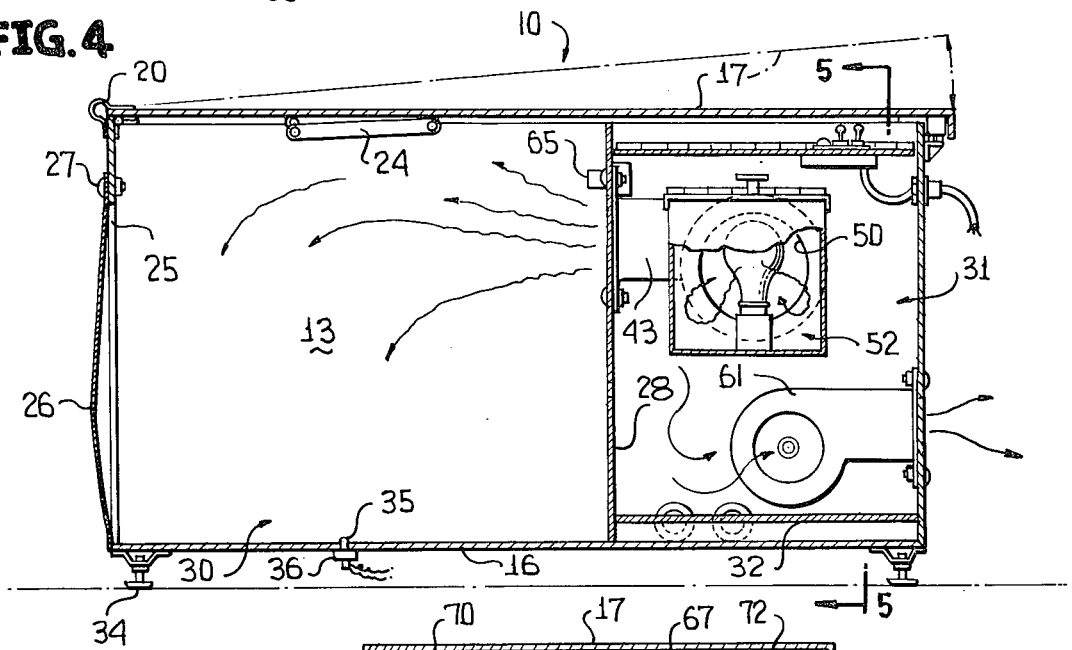
FIG. 4 is a sectional view taken generally along line 4—4 of FIG. 3, and additionally illustrates the components of the second chamber.

The second chamber 31 houses various mechanical and electrical components to be described immediately hereinafter and is defined by portions of the walls 12, 13, the end wall 15, the partition wall 28, and a further bottom wall 32 (FIGS. 1, 4 and 5), which is inclined downwardly from left-to-right, as viewed in FIGS. 1 and 5 toward aperture means 33 formed in the side wall 13 contiguous the bottom for the purpose of permitting any undesired condensation which may form in the chamber 31 to flow by gravity to the exterior thereof through the apertures 33. That portion of the bottom wall 16 which underlies the wall 32, as best shown in FIG. 4 may, of course, be eliminated. However, due to the fact that the bottom wall 16 spans the entire distance between the end walls 12, 15 for conventional screw adjusted feet 34 are readily welded, riveted, or otherwise secured at each corner of the bottom wall 16 and moreover leveling of the overall housing 11 is rendered much easier when all screw feet 34 are reactive relative to the same plane (the bottom wall 16) as opposed to an alternative construction when two of the screw feet might be attached to the inclined bottom wall 32.

The partition wall 28 may if desired though not necessary have one or more vent openings 41 formed either at the top or bottom thereof and another opening 42 (FIG. 5) covered by a conduit 43 which in effect forms a portion of a blower housing 44. Flanges 45 are riveted, screwed or otherwise fastened to the partition wall 28. A conventional electric motor 46 is supported by the blower housing 44 and a shaft 47 as secured thereto a fan blade 48 (FIG. 1). The shaft 47 passes, of course, through an opening (not shown) in the blower housing which opposes an opposite larger opening 50 (FIG. 4) surrounded by a like opening 51 formed in a wall (unnumbered) of a third chamber 52 which is suitably secured to a short conduit portion 53 (FIG. 5) of the blower housing 44. The third housing 52 includes a plurality of vent openings 53 (FIG. 1) and a cover 54 hinged thereto for opening and closing along with a sight opening 55 for visually inspecting whether or not a standard light bulb 56 received in an electrical socket 57 is lit or unlit when the circuit of FIG. 4 is energized.

Another conventional fan 60 having a housing 61 is secured conventionally to the end wall 15 and blows air from the interior of the second chamber 31 to atmosphere through an opening 62. The fan 60, housing 61, and apertures 62 may be totally eliminated since the purpose thereof is simply to exhaust air from the second chamber 31 which in turn causes air to be drawn from atmosphere through the apertures 33 causing a high degree of ambient air from atmosphere to be recirculated by the fan 48 into the chamber 30 to prevent odors or the like from being created which might otherwise occur to a greater degree absent the introduction of fresh air and simply the recirculation of generally stagnant air except that which might normally enter into the first chamber 30 through the apertures 41 and leakage through the opening 25 or the opening and closing thereof by the opening and closing of the flap 26. As another alternate a conduit could be coupled from the housing 44 to atmosphere, though the latter would exhaust heated air to atmosphere but would also draw fresh air into the chamber 31 through the apertures 33. However, the air lost by exhausting in the latter manner would be negligible due to the use of a relatively small diametered pipe or conduit.

Thermostats 65, 66 form a part of the circuit 40 and are suitably connected to the walls 28, 13.

Figure 5:
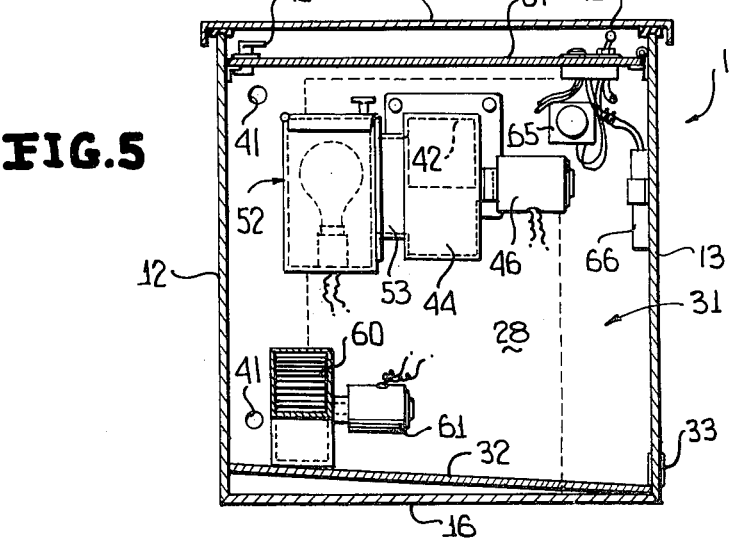
FIG. 5 is a sectional view taken generally along line 5—5 of FIG. 4, and additionally illustrates the components of the second chamber.

An additional cover 67 is joined by a hinge 68 to the wall 13 and spans the entire open upper end of the second chamber 31 in the manner best illustrated in FIG. 5 with an edge thereof opposite the hinge 68 being provided with a conventional rotatable or magnetic latch 70.

The cover 67 carries a neon lamp 71, and on-off switch 72, and a circuit breaker 73.

Reference is now made to FIG. 2 and the cuicuitry 40 which has reference numerals thus far described applied thereto. A portion of the circuit 40 is sealed in epoxy or similar weatherproof housing 80 connected to the underside of the cover 67 below the area of the components 71 through 73. Upon manual closure of switch 72 in the chamber 30 a circuit is established through the circuit breaker 73 to light the neon light 71 which is in parallel to a varistor 81.

Located in the circuit of the thermostat 65, the lamp 56, and the motor (unnumbered) of the fan 48 is a resistor 82 and a triac 83. Likewise, located in the circuit of the motor (not shown) of the fan 60 and the thermostat 66 is a resistor 84 and a triac 85.

Assuming that the temperature within the chamber 30 is at or above desired (72°F.), neither the lamp 56 nor the motor of the fan 48 are energized. However, when the switch (not shown) of the thermostat 65 closes at a temperature below that desired within the chamber 30 the circuit through the components 56, 48, 82, and 83 closes lighting the lamp 56 and energizing the motor 48 to thereby generate heat and blow this heat by the fan 48 into the chamber 30. When the temperature in chamber 30 rises to 72°F. the switch in the thermostat 65 opens and deenergizes the lamp 56 and the motor for the fan 48.

In addition to the operation of the fan 60 heretofore described which would simply require the fan 60 to be placed in parallel with the components 56, 48, a further embodiment of the invention includes the inclusion of the motor of the fan 60 in the circuit of the electrical components 84, 85 and 66. In this case the switch of the thermostat 66 closes should the temperature within the chamber 31 reach 150°F. In this case the fan 60 is energized and air is exhausted from the chamber 31 to thereby assure that overheating in the chamber 31 will not occur.

The foregoing specific description of the animal house 10 is considered ample evidence of the objectives attained thereby as heretofore described.

While preferred forms and arrangements of parts have been shown in illustrating the invention, it is to be clearly understood that various changes in detail and arrangement of parts may be made without departing from the spirit and scope of this disclosure.

I claim:

1. An animal house comprising a housing, means setting off a pair of chambers in said housing, entrance means through which an animal may pass into and out of a first of said chambers, closure means openable to gain access into said chambers, heat generating means located in a second of said chambers for generating heat to heat said first chamber, means for conducting the heat generated by said heat generating means into said first chamber, said heat conducting means including first fan means for blowing the generated heat into said first chamber, second fan means in said second chamber for circulating air in said second chamber, and means for regulating the operation of said second fan means to preclude the internal temperature of said second chamber from rising above a desired maximum temperature to thereby preclude overheating of said second chamber by said generated heat.

2. The animal housing as defined in claim 1 including means in said second chamber for precluding the internal temperature of said second chamber from rising above a desired maximum temperature by deenergizing said heat generating means.

3. The animal housing as defined in claim 2 wherein said heat generating means includes a socket for an electric light bulb, and said heat conducting means includes a fan for blowing the generated heat of an electric light bulb adopted for connection to said socket into said first chamber.

4. The animal house as defined in claim 2 wherein said closure means is a cover common to both of said chambers.

5. The animal house as defined in claim 2 wherein said closure means is a first cover common to both of said chambers, and a second cover for said second chamber internally of said first cover.

6. The animal house as defined in claim 2 including aperture means through said housing of said second chamber, and means for exhausting air from said second chamber to atmosphere.

7. The animal housing as defined in claim 1 wherein said heat generating means includes a socket for an electric light bulb, and said heat conducting means includes a fan for blowing the generated heat of an electric light bulb adopted for connection to said socket into said first chamber.

8. The animal house as defined in claim 7 wherein said closure means is a cover common to both of said chambers.

9. The animal house as defined in claim 7 wherein said closure means is a first cover common to both of said chambers, and a second cover for said second chamber internally of said first cover.

10. The animal house as defined in claim 7 including aperture means through said housing contiguous a bottom of said second chamber.

11. The animal house as defined in claim 1 wherein said closure means is a cover common to both of said chambers.

12. The animal house as defined in claim 1 wherein said closure means is a first cover common to both of said chambers, and a second cover for said second chamber internally of said first cover.

13. The animal house as defined in claim 1 including aperture means through said housing contiguous a bottom of said second chamber.

14. The animal house as defined in claim 1 including aperture means through said housing of said second chamber, and said regulating means includes means for exhausting air from said second chamber to atmosphere.

15. An animal house comprising a housing, means setting off a pair of chambers in said housing, entrance means through which an animal may pass into and out of a first of said chambers, closure means openable to gain access into said chambers, heat generating means located in a second of said chambers for generating heat to heat said first chamber, means for conducting the heat generated by said heat generating means into said first chamber, first and second aperture means through said housing of said second chamber, and conduit means connecting said heat conducting means to said first aperture means whereby air exhausted to atmosphere through said first aperture means is replenished by air drawn into said second chamber through said second aperture means thus precluding stagnation of air in said first chamber.

16. The animal house as defined in claim 15 including a third chamber in said second chamber housing said heat generating means, and said heat conducting means includes conduit means placing said first and third chambers in fluid communication.

* * * * *